United States Patent
Filsfils et al.

(10) Patent No.: US 8,467,394 B2
(45) Date of Patent: *Jun. 18, 2013

(54) AUTOMATIC ROUTE TAGGING OF BGP NEXT-HOP ROUTES IN IGP

(75) Inventors: Clarence Filsfils, Brussels (BE); Stefano B. Previdi, Rome (IT); Jean-Philippe Vasseur, Saint Martin dUriage (FR)

(73) Assignee: Cisco Technology, Inc., San Jose, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/149,535

(22) Filed: May 31, 2011

(65) Prior Publication Data

US 2011/0228785 A1 Sep. 22, 2011

Related U.S. Application Data

(63) Continuation of application No. 11/025,203, filed on Dec. 29, 2004, now Pat. No. 7,978,708.

(51) Int. Cl.
*H04L 12/28* (2006.01)
*H04L 12/56* (2006.01)

(52) U.S. Cl.
USPC ...... 370/395.31; 370/252; 370/254; 370/352; 370/351; 370/238; 370/395.32

(58) Field of Classification Search
USPC ............ 370/238, 252, 254, 351, 352, 392, 370/469, 395.32, 395.31; 709/224, 238, 242, 709/239; 379/221.02; 714/4
See application file for complete search history.

(56) References Cited

U.S. PATENT DOCUMENTS

| | | |
|---|---|---|
| 5,519,704 A | 5/1996 | Farinacci et al. |
| 6,202,114 B1 | 3/2001 | Dutt et al. |
| 6,219,739 B1 | 4/2001 | Dutt et al. |
| 6,658,481 B1 | 12/2003 | Basso et al. |
| 6,744,774 B2 | 6/2004 | Sharma |
| 6,757,258 B1 | 6/2004 | Pillay-Esnault |
| 6,820,134 B1 | 11/2004 | Zinin et al. |
| 6,857,026 B1 * | 2/2005 | Cain .............................. 709/239 |
| 6,968,393 B1 * | 11/2005 | Chen et al. ..................... 709/242 |
| 7,027,396 B1 | 4/2006 | Golan et al. |
| 7,139,242 B2 | 11/2006 | Bays |

(Continued)

OTHER PUBLICATIONS

European Patent Office, Supplementary European Search Report of Cisco Technology, Inc., EP 05855668, dated Dec. 17, 2010, 7 pages.

(Continued)

*Primary Examiner* — Chuong T Ho
(74) *Attorney, Agent, or Firm* — Cesari and McKenna, LLP

(57) ABSTRACT

In one embodiment, a router in a routing domain exchanges routing information with one or more other routers located external to the routing domain using an exterior gateway protocol (EGP). The router exchanges routing information with one or more other routers located internal to the routing domain using an interior gateway protocol (IGP). The router detects a route to be advertised by the IGP is also used as a next-hop attribute of a route advertised by the EGP. In response, the router tags the route advertised by the IGP as an important route for convergence to indicate that the tagged route is to be processed before other routes that have not been tagged during convergence processing. The tagged route is advertised within the routing domain using the IGP.

20 Claims, 7 Drawing Sheets

U.S. PATENT DOCUMENTS

| | | | |
|---|---|---|---|
| 7,180,864 B2* | 2/2007 | Basu et al. | 370/238 |
| 7,197,040 B2 | 3/2007 | Bressoud et al. | |
| 7,225,270 B2 | 5/2007 | Barr et al. | |
| 7,318,108 B2* | 1/2008 | Sreekantiah et al. | 709/242 |
| 7,436,838 B2 | 10/2008 | Filsfils et al. | |
| 7,532,631 B2* | 5/2009 | Raszuk et al. | 370/401 |
| 7,639,688 B2 | 12/2009 | Filsfils et al. | |
| 7,647,426 B2* | 1/2010 | Patel et al. | 709/239 |
| 7,660,314 B2 | 2/2010 | Wybenga et al. | |
| 7,778,248 B2 | 8/2010 | Scudder et al. | |
| 7,978,708 B2* | 7/2011 | Filsfils et al. | 370/395.31 |
| 2002/0131362 A1 | 9/2002 | Calion | |
| 2003/0112809 A1 | 6/2003 | Bharali et al. | |
| 2004/0081154 A1 | 4/2004 | Kouvelas | |
| 2006/0002402 A1* | 1/2006 | Nalawade et al. | 370/401 |
| 2006/0013127 A1 | 1/2006 | Izaiku et al. | |
| 2006/0052099 A1 | 3/2006 | Parker | |
| 2006/0092940 A1 | 5/2006 | Ansari et al. | |
| 2006/0092976 A1 | 5/2006 | Lakshman et al. | |
| 2006/0159076 A1 | 7/2006 | Bless et al. | |
| 2007/0014293 A1 | 1/2007 | Filsfils et al. | |
| 2007/0097973 A1 | 5/2007 | Scudder et al. | |

OTHER PUBLICATIONS

Martin, C., A Policy Control Mechanism is IS-IS Using Administrative Tags, <draft-martin-neal-policy-isis-admin-tags-02.txt>, IETF Network Working Group Internet Draft, May 2002, 5 pages.

"Notification of Transmittal of the International Search Report and the Written Opinion of the International Searching Authority, or the Declaration" of International Application No. PCT/US05/41150 with an International Filing date of Dec. 27, 2005.

H. Smit and T. Li, "Intermediate system to Intermediate System (IS-IS) Extensions for Traffic Engineering (TE)," Request for Comments 3784, Jun. 2004.

Christian Martin et al., "A Policy Control Mechanism in IS-IS Using Administrative tags," Internet Draft: www.ietf.org/internet-drafts/draft-ietf-isis-admin-tags-02.txt, Jul. 2004.

J. Moy, "OSPF Version 2", Request for Comments 2328, Apr. 1998.

R. Callon, "Use of OSI IS-IS for Routing in TCP/IP and Dual Environments", Request for Comments 1195, Dec. 1990.

Y Rekhter et al., "A Border Gateway Protocol 4 (BGP-4)", Request for Comments 1771, Mar. 1995.

Radia Perlman, "Interconnections Bridges and Routers", Addison-Wesley Publishing Company, Inc. 1992, pp. 323-329.

Y. Rekhter et al., "A Border Gateway Protocol 4 (BGP-4)", Internet Draft: www.ietf.org/internet-drafts/draft-ietf-idr-bgp4-23.txt, Nov. 2003.

Clarence Filsfils et al., U.S. Patent Application "Automatic Prioritization of BGP Next-Hop in IGP Convergence", Serial Number not yet assigned, Filed Dec. 29, 2004.

* cited by examiner

AUTOMATIC ROUTE TAGGING OF BGP NEXT-HOP ROUTES IN IGP

CROSS-REFERENCE TO RELATED APPLICATION

The present application is a continuation of U.S. patent application Ser. No. 11/025,203, filed on Dec. 29, 2004 by Clarence Filsfils et al., and titled Automatic Route Tagging of BGP Next-Hop Routes in IGP, the contents of which are incorporated by reference herein in their entirety.

FIELD OF THE INVENTION

This invention relates generally to computer networks, and, more specifically, to a technique for enhancing convergence in a computer network.

BACKGROUND OF THE INVENTION

Data communication in a computer network involves the exchange of data between two or more entities interconnected by communication links and subnetworks (subnets). These entities are typically software programs executing on hardware computer platforms, such as end nodes and intermediate network nodes. The intermediate network nodes interconnect the communication links and subnets to enable transmission of data between the end nodes, such as personal computers or workstations. A local area network (LAN) is an example of a subnet that provides relatively short distance communication among the interconnected nodes, whereas a wide area network (WAN) enables long distance communication over links provided by public or private telecommunications facilities. The Internet is an example of a WAN that connects disparate computer networks throughout the world, providing global communication between nodes on various networks.

Communication software executing on the nodes correlate and manage data communication with other nodes. The nodes typically communicate by exchanging discrete messages or packets of data according to predefined protocols, such as the Trans-mission Control Protocol/Internet Protocol (TCP/IP). In this context, a protocol consists of a set of rules defining how the nodes interact with each other. In addition, network routing software executing on the intermediate nodes allow expansion of communication to other nodes. Collectively, these hardware and software components comprise a collection of computer networks.

Since management of computer networks can prove burdensome, smaller groups of one or more computer networks can be maintained as separate routing domains or autonomous systems (ASes). In this context, a routing domain is broadly construed as a collection of interconnected nodes within a common address space (e.g., a level, area or AS), and an AS is a routing domain managed by a single administrative entity, such as a company, an academic institution or a branch of government. To interconnect dispersed is networks and/or provide Internet connectivity, many organizations rely on the infrastructure and facilities of Internet Service Providers (ISPs). An ISP is an example of an AS that typically owns one or more "backbone" networks configured to provide high-speed connection to the Internet. To interconnect private routing domains that are geographically diverse, an organization (customer) may subscribe to one or more ISPs and couple its private domain networks to the ISP's equipment. Here, an intermediate network node, such as a switch or router, may be utilized to interconnect a plurality of private networks to an IP backbone network.

ISP backbone networks generally require fast convergence in order to provide a reliable service to its customers. Convergence, in this context, denotes the ability of a router or network to react to failures or, more generally, to network events and to recover from those failures in order to have minimal disruption time. Examples of such failures include link or node failures. Fast convergence thus involves the ability of the ISP backbone networks to react very quickly to such link and node failures to thereby reroute traffic over alternate paths and, thus, minimize service disruption.

A main component of fast convergence in a router is a routing information base (RIB). The RIB is a process that manages a routing table that holds many (e.g., thousands) of routes computed by different protocols, including both interior gateway protocols (IGP) and exterior gateway protocols (EGP). IGP protocols, such as conventional link-state protocols, are intra-domain routing protocols that define the manner with which routing information and network-topology information are exchanged and processed in a routing domain, such as an ISP backbone network. Examples of conventional link-state protocols include, but are not limited to, the Open Shortest Path First (OSPF) protocol and the Intermediate-System-to-Intermediate-System (ISIS) protocol. The OSPF protocol is described in more detail in Request for Comments (RFC) 2328, entitled *OSPF Version 2*, dated April 1998, which is incorporated herein by reference in its entirety. The ISIS protocol is described in more detail in RFC 1195, entitled *Use of OSI IS-IS for Routing in TCP/IP and Dual Environments*, dated December 1990, which is incorporated herein by reference in its entirety.

Each router running a link-state protocol (i.e., IGP) maintains an identical link-state database (LSDB) describing the topology of the routing domain. Each piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighbors for the purpose of exchanging routing information and abstracting the network topology. One or more router adjacencies may be established over an interface. Each router distributes its local state throughout the domain in accordance with an initial LSDB synchronization process and a conventional flooding algorithm.

In order to guarantee convergence of a link-state protocol, link-state protocol data units (PDUs) that originate after an initial LSDB synchronization between neighbors is completed are delivered to all routers within the flooding scope limits. The PDUs are used to exchange routing information between interconnected routers. The flooding scope limits may comprise an area, a level or the entire AS, depending on the protocol and the type of link-state PDU. An area or level is a collection or group of contiguous networks and nodes (hosts), together with routers having interfaces to any of the included networks. Each area/level runs a separate copy of the link-state routing algorithm and, thus, has its own LSDB. In the case of OSPF, the PDU is a link state advertisement (LSA) comprising a unit of data describing the local state of a router or network, whereas in the case of ISIS, the PDU is a link state packet (LSP). As used herein, a LSA generally describes any message used by an IGP process to communicate routing information among the nodes, such that the collected LSAs of all routers and networks form the LSDB for the particular link-state protocol.

Broadly stated, the IGP process executing in a sending router typically generates and disseminates a LSA whose routing information includes a list of the node's neighbors and one or more "cost" values associated with each neighbor. A cost value associated with a neighbor is an arbitrary metric used to determine the relative ease/burden of communicating with that router. For instance, the cost value may be measured in terms of the number of hops required to reach the neighbor, the average time for a packet to reach the neighbor, and/or the amount of network traffic or available bandwidth over a communication link coupled to the neighbor.

LSAs are typically transmitted ("advertised") among the routers until each router can construct the same "view" of the network topology by aggregating the received lists of neighbors and cost values. The IGP process advertises routes internal to the routing domain ("internal routes") via LSAs that typically comprise the routers' loopback addresses as well as interface/link addresses. A loopback address is a type of "virtual" interface identifier of the router that is stable and always available (does not fail) and, as such, is advertised instead of a physical interface address to ensure that the router can always reach its neighbor. Each router may input this received routing information to a "shortest path first" (SPF) calculation that determines the lowest-cost network paths that couple the router with each of the other network nodes. The well-known Dijkstra algorithm is a conventional technique for performing such a SPF calculation, as described in more detail in Section 12.2.4 of the text book *Interconnections Second Edition*, by Radia Perlman, published September 1999.

The routers typically have a topology table that contains all destinations advertised by neighbors. Each entry in the topology table includes the destination address and a list of neighbors that have advertised the destination. For each neighbor, the entry records the advertised metric, which the neighbor stores in its routing table. The metric that the router uses to reach the destination is also associated with the destination. The metric that the router uses in the routing table, and to advertise to other routers, is the sum of the best-advertised metric from all neighbors and the link cost to the best neighbor. An example of a topology table is the LSDB having a map of every router, its links and the states of those links in the routing domain. The LSDB also has a map of every network and every path to each network in the routing domain.

Specifically, the LSA is processed by the IGP process of a receiving router and provided to the RIB so that it can process the advertisement (along with other routing information) to determine best paths for purposes of populating a forwarding table of a forwarding information base (FIB). In a link state protocol, such as ISIS and OSPF, the router that is directly affected by a failure (i.e., closest to the failure) advertises such failure via the LSA to the rest of the network. In response, each router in the network computes a new network topology and, thus, a new path around the failure. To achieve fast convergence, the IGP process of each router re-computes its topology table and updates the routing table to reflect the topology change. More specifically, the SPF calculation is applied to the contents of the LSDB to compute a shortest path to each destination network. To that end, the algorithm prunes the database of alternate paths and creates a loop-free shortest path tree (SPT) of the topological routing domain. The routing table is then updated to correlate destination nodes with network interfaces associated with the lowest-cost paths to reach those nodes, as determined by the SPF calculation.

A plurality of interconnected ASes may be configured to exchange messages in accordance with an EGP, such as the Border Gateway Protocol version 4 (BGP). To implement the BGP protocol, each routing domain (e.g., AS) includes at least one "border" router through which it communicates with other, interconnected ASes. Before transmitting such messages, however, the routers cooperate to establish a logical "peer" connection (session). BGP is an inter-domain routing protocol that generally operates over a reliable transport protocol, such as TCP, to establish a TCP connection/session; any two border routers that have opened a TCP connection (session) to each other for the purpose of exchanging routing information are known as peers or neighbors. BGP performs routing between ASes by exchanging routing (reachability) information among neighbors of the systems.

The routing information exchanged by BGP neighbors typically includes destination address prefixes, i.e., the portions of destination addresses used by the routing protocol to render routing ("next hop") decisions, and associated path attributes. Examples of such destination addresses include Internet Protocol (IP) version 4 (IPv4) and version 6 (IPv6) addresses, while an example of a path attribute is a next-hop address. Note that the combination of a set of path attributes and a prefix is referred to as a "route"; the is terms "route" and "path" may be used interchangeably herein. The BGP routing protocol is well known and described in detail in *Request For Comments (RFC)* 1771, by Y. Rekhter and T. Li (1995), *Internet Draft <draft-ietf-idr-bgp4-20.txt>* titled, *A Border Gateway Protocol* 4 (BGP-4) by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

Two BGP-enabled routers (i.e., BGP speakers) that are not in the same AS use external BGP (eBGP) to exchange routes. Internal BGP (iBGP) is a form of BGP that exchanges routes among iBGP neighbors within an AS. BGP speakers within an AS are typically connected via a fully meshed iBGP session arrangement to ensure that all BGP speakers receive route updates from the other BGP speakers in the AS. When a BGP speaker receives updates from multiple ASes that describe different paths to the same destination, the speaker chooses a single best path for reaching that destination (prefix). Once chosen, the speaker uses BGP to propagate that best path to its neighbors. The decision is based on the value of attributes, such as next-hop, contained in a BGP update message and other BGP-configurable factors. In this context, the BGP next-hop attribute is the network (IP) address of the next hop (neighbor) used to reach the destination prefix.

More specifically, each route advertised by BGP must have a next hop address that is reachable through IGP in order for that route to be considered valid. That is, a valid BGP route must contain an attribute (such as a BGP next-hop address) that, in turn, must exist in the routing table of the router through IGP. Both BGP and IGP (OSPF, ISIS) processes executing on a router provide routes (best paths per prefixes) to the RIB; however, among the prefixes provided by IGP that the RIB installs into the routing table are those prefixes that are used as BGP next hop addresses. These BGP next hop addresses are illustratively loopback addresses of the BGP next-hop routers.

As noted, ISP backbone networks require fast convergence in order to provide a reliable service to its customers. Convergence occurs when all of the routers have a consistent perspective ("view") of the network topology. After a topology change, e.g., one or more link and/or node failures, the routers re-compute their best paths; this typically disrupts the service provided by the ISP. The ISP backbone networks must therefore be able to react quickly to such failures in order to re-route traffic over alternate paths and, thus, minimize service disruption. However, not all routes require fast convergence. Typically the routes (addresses) used as BGP next-hop attributes within BGP update messages are considered most important addresses because they enable connectivity inside and outside of the routing domain. For example, these next-hop addresses are typically addresses of subnets used to connect servers/gateways; as such, they are considered most important because BGP relies on them for external activity, i.e., activity external to the routing domain. Yet, the addresses of subnets used to connect servers and gateways could also be part of an internal routing domain. Here, the routers may connect voice over IP (VoIP) servers, such that all IP telephony of the routing domain relies on those servers. Therefore it is desirable to prioritize these next hop addresses to enable fast convergence.

A known approach used to determine whether addresses advertised by a routing protocol are important for fast convergence involves explicit configuration by an administrator (user) of a group of routes. Here, the group of routes (addresses) is part of a block of addresses that the user configures as important on each router. Another, more precise approach for determining whether an address advertised by a routing protocol (such as IGP) is important for fast convergence is based on route labeling or "route tagging". An example of route tagging is a conventional ISIS route tag where a user "tags" each important route needed for fast convergence with an administrative tag.

However, conventional route tagging requires coordination within the network in the sense that every router must be "manually" configured to process (with a predetermined degree of importance) routes having, e.g., a predetermined tag value. For example, an ISP user/administrator may configure the IGP (ISIS) routing protocol running on each router in its ISP network with a command that specifies routes tagged with a predetermined value are important routes. Thus, a limitation to the conventional use of ISIS route tags is the coordination among routers within a routing domain and extensive manual configuration on behalf of the administrator in order to implement such coordination. The present invention substantially reduces manual configuration required to tag routes as important.

SUMMARY OF THE INVENTION

The present invention overcomes the disadvantages of the prior art by providing a technique for configuring an intermediate network node to automatically determine whether a route advertised by a routing protocol is important for fast convergence in a computer network. As used herein, an important route needed for fast convergence is a route advertised by the routing protocol, such as an exterior gateway routing protocol (EGP) process executing on the node, as a next-hop address, since external connectivity relies on such a route. Notably, the EGP process interacts with an interior gateway routing protocol (IGP) process executing on the node to identify the route as an important route. Identification of an important route, in turn, allows IGP to process the route in a high priority fashion, thereby facilitating fast convergence.

In the illustrative embodiment described herein, the intermediate network node is a router and the IGP process is an Intermediate-System-to-Intermediate-System (ISIS) protocol process. In addition, the EGP is the Border Gateway Protocol (BGP) and, to that end, the important route is a route that represents a BGP next-hop attribute. The inventive technique is illustratively directed to automatically (dynamically) determining such an important route using, e.g., ISIS route tagging. More precisely, the inventive technique allows the router to detect whether an IGP route is also used as a BGP next-hop attribute and, if so, advertise that route to IGP neighbors in the routing domain using ISIS route tagging so the neighbors (and router) can process the route with high priority during convergence.

Operationally, a BGP process executing on a router to inject internal BGP (iBGP) routes into a routing domain also interacts with an IGP process executing on the router to identify a local prefix used as a BGP next hop attribute for those iBGP routes injected into the domain. Using ISIS route tagging, the router tags the local prefix as an important is route for convergence and advertises that tagged route throughout the domain. In response, all IGP routers (including the router) within the routing domain may detect the importance of the tagged route and apply high priority to the route during convergence processing.

Advantageously, the present invention provides a technique whereby the importance of a route is determined by an originator of the route, e.g., the BGP process executing on a router, as opposed to a receiver of the route, e.g., the IGP process of the router and neighboring routers. Since the originator of the route sets the importance of the route, the inventive technique provides an efficient, "backward compatible" approach to determining whether a route advertised by a routing protocol, such as BGP, is important for fast convergence in a computer network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
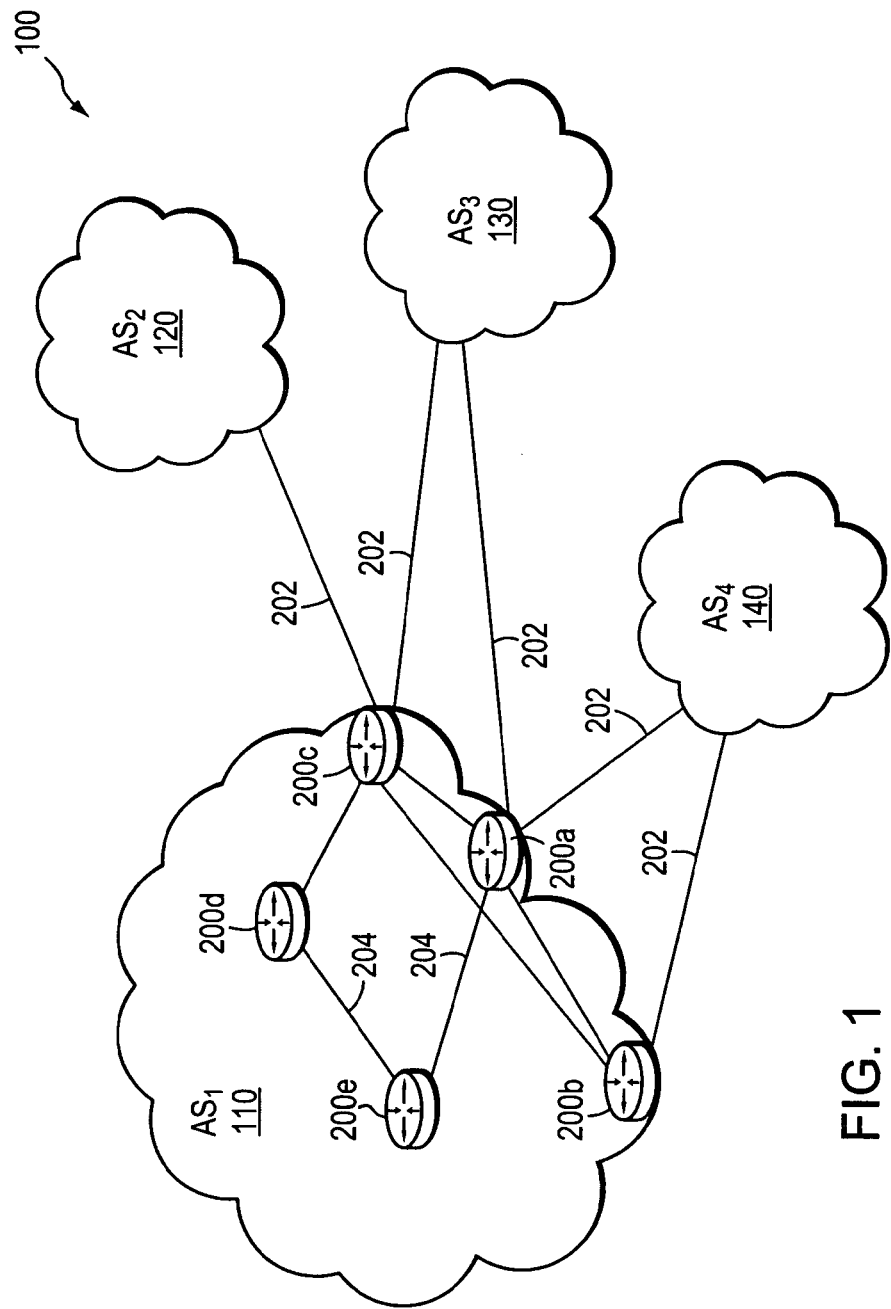
FIG. 1 is a schematic block diagram of a computer network comprising a plurality of routing domains interconnected by intermediate network nodes, such as routers.

FIG. 1 is a schematic block diagram of a computer network 100 comprising a plurality of routing domains interconnected by intermediate network nodes. The intermediate network nodes may comprise switches but, in the illustrative embodiment, are routers 200. The routing domains or autonomous systems ($AS_{1-4}$) are illustratively interconnected by border routers 200a-c via point-to-point communication links 202, such as frame relay links, asynchronous transfer mode links or other serial links. The border routers 200a-c of AS 110 ($AS_1$) are illustratively coupled to routers 200d-e via subnetworks, such as local area networks 204. Communication among the routers 200 is typically effected by exchanging discrete data packets or messages in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Routing decisions within each AS may rely on a predetermined "interior" gateway routing protocol (IGP). An example of an IGP is a conventional link-state protocol, such as the Open Shortest Path First (OSPF) or Intermediate-System-to-IntermediateSystem (ISIS) protocol. In addition, routing information may be exchanged among the ASes 110-140 using an "exterior" gateway protocol (EGP), such as the Border Gateway Protocol version 4 (BGP). To that end, the BGP-enabled routers (BGP speakers) 200a-c exchange routing information with other BGP speakers that are not in the same AS using an external form of BGP (eBGP), while the BGP speakers 200a-c within an AS exchange routing information using an internal form of BGP (iBGP).

Figure 2:
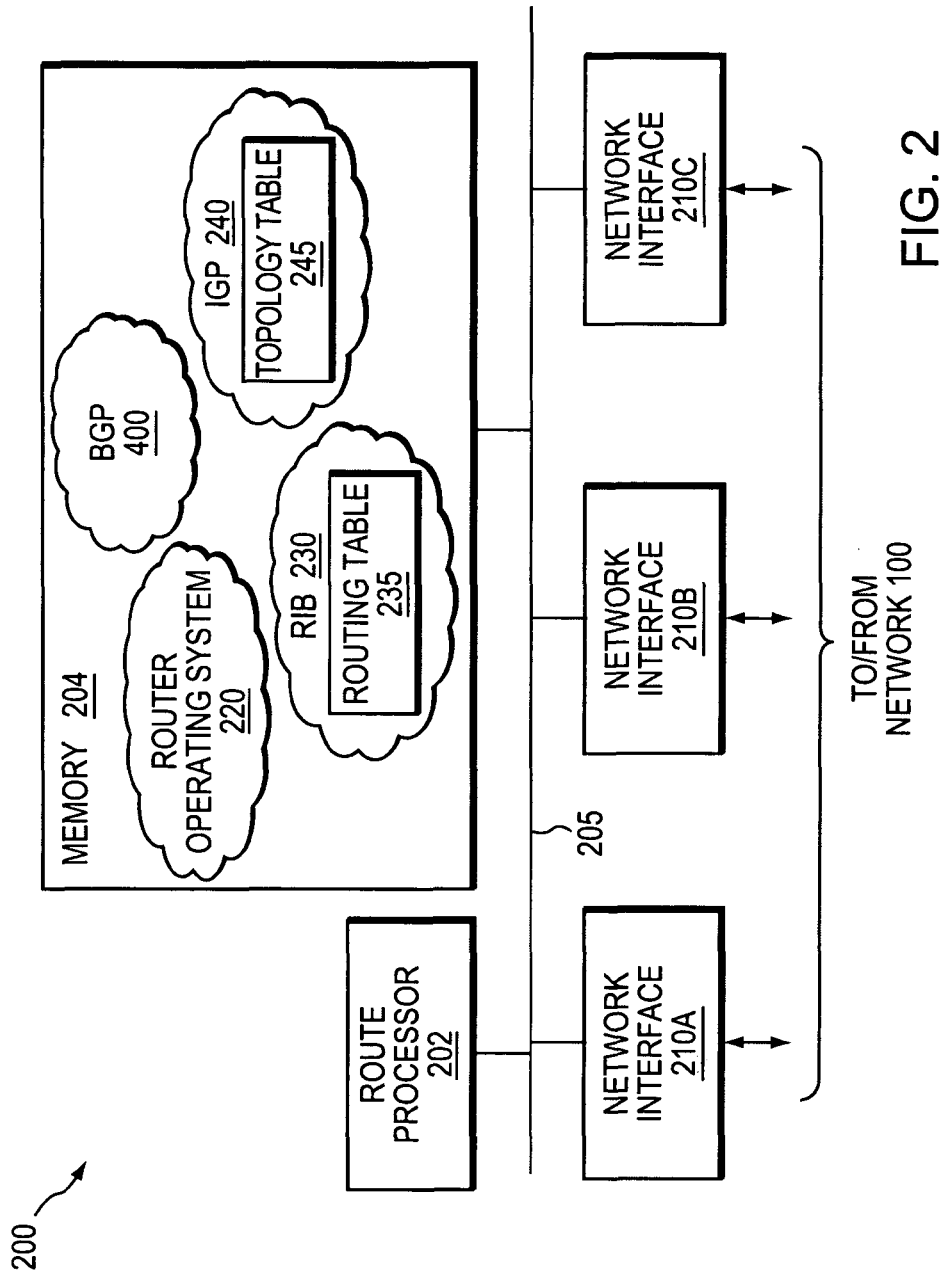
FIG. 2 is a schematic block diagram of an embodiment of a router that may be advantageously used with the present invention.

FIG. 2 is a schematic block diagram of a router 200 that may be advantageously used as a border router in accordance with the present invention. The router 200 comprises a route processor 202 coupled to a memory 204 and a plurality of network interface adapters $210_{A-C}$ via a bus 205. The memory 204 may comprise storage locations addressable by the processor and interface adapters for storing software programs and data structures, such as a routing table 235 and topology table 245, respectively, that may be advantageously used with the inventive technique described herein. The route processor 202 may comprise processing elements or logic for executing the software programs and manipulating the data structures. It will be apparent to those skilled in the art that other processor and memory means, including various computer readable media, may be used for storing and executing program instructions pertaining to the inventive technique described herein.

A router operating system 220, portions of which are typically resident in memory 204 and executed by the route processor 202, functionally organizes the router by, inter alia, invoking network operations in support of software processes executing on the router. In one embodiment of the invention, the operating system 220 may be implemented as a single process with a large memory address space, wherein pieces of code within that process provide operating system services, such as one or more routing protocols. Yet, in the illustrative embodiment, the operating system services may be implemented as separately-scheduled processes in distinct, protected address spaces. These software processes, each with its own process address space, execute on the router to manage resources internal to the router and, in the case of a routing protocol, to interact with users. As described herein, these software processes include routing information base (RIB 230) and routing protocol modules, such as IGP 240 and BGP 400. Communication among the processes is typically effected by the exchange of messages; a known message-passing mechanism provided by router operating system 220 to transfer information between processes (and process address spaces) is the Inter Process Communication (IPC) mechanism.

Figure 3:
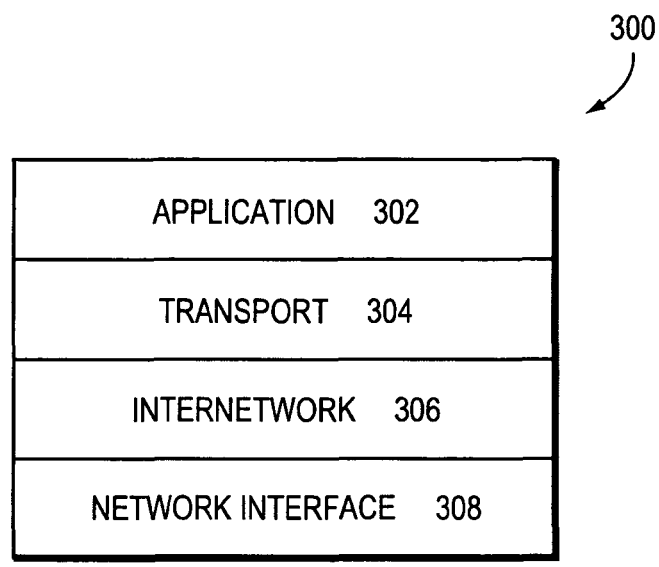
FIG. 3 is a schematic block diagram of a conventional network protocol stack, such as the Internet communications protocol stack, within the router of FIG. 2.

A key function of the router 200 is determining the next node to which a packet is sent; in order to accomplish such "routing" the routers cooperate to determine optimal paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for endto-end reliability. An example of such a transport protocol is the TCP protocol, which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that routers utilize so that they can cooperate to calculate paths through the computer network 100. IGP 240, such as OSPF or, illustratively, ISIS, is an intra-domain routing protocol that may be used to perform routing (for the internetwork layer 306) within each routing domain of the computer network 100. As noted, IGP 240 maintains a topology table 245 that is configured to store a database of the entire set of nodes and links in the network. This database is provided as an input to a shortest path first (SPF) calculation, e.g., the Dijkstra algorithm, which output is used to construct a shortest path tree (SPT). The SPT is the set of shortest paths, e.g., from the router that computes the algorithm, to any other router in the network. The SPT is thus a subset of the entire database of links and nodes that results from essentially pruning the database. The output of SPT computation is then is provided to the RIB 230. That is, the IGP process 240 provides to the RIB 230 all address prefixes that have been advertised by other nodes in the network that are part of the SPT. The RIB then computes (installs) those prefixes into its routing table 235.

The Border Gateway Protocol version 4 (BGP) is an inter-domain routing protocol used to perform routing (for the internetwork layer 306) between routing domains (e.g., ASes) of the computer network. BGP speakers within the ASes (hereinafter "neighbors") exchange routing and reachability information among the ASes over a reliable transport layer connection, such as TCP. An adjacency is a relationship formed between selected neighbors for the purpose of exchanging routing messages and abstracting the network topology. The BGP protocol uses the TCP transport layer 304 to ensure reliable communication of routing messages among the neighbors.

In order to perform routing operations in accordance with the BGP protocol, each BGP speaker 200a-c maintains a routing table that lists all feasible paths to a particular network. The routers further exchange routing information using BGP routing update messages when their routing tables change. The routing update messages are generated by an updating router to advertise routes to each of its neighbors throughout the computer network. These routing updates allow the BGP routers of the ASes to construct a consistent and up-to-date view of the network topology.

Figure 4:
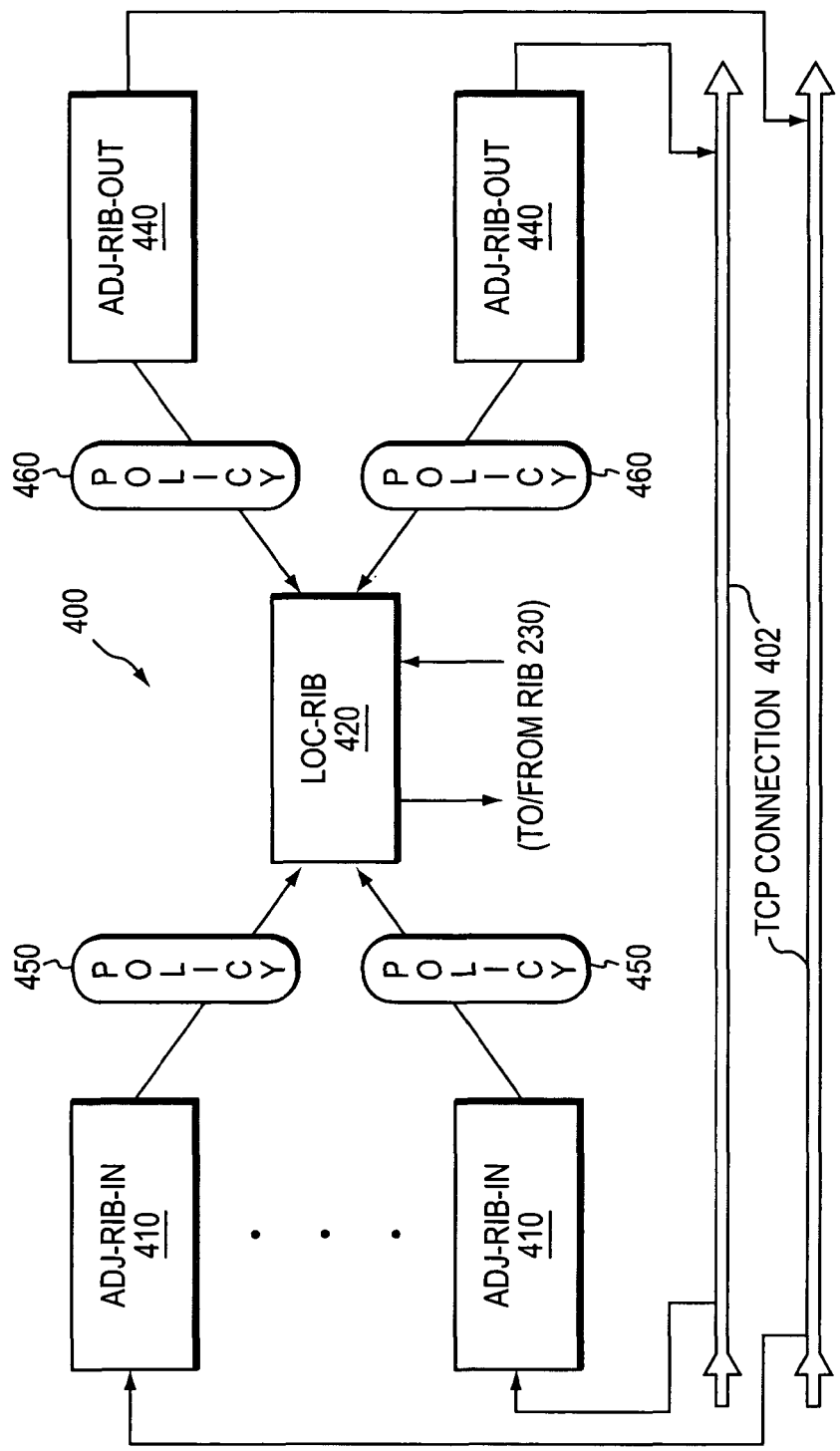
FIG. 4 is a schematic block diagram illustrating the architecture of the Border Gateway Protocol (BGP)

FIG. 4 is a schematic block diagram illustrating the architecture of the BGP proton col 400. BGP neighbors announce routing updates via TCP connections 402. The BGP protocol "listens" for routing update messages and stores all learned routes for each connection in a BGP database. The BGP database is illustratively organized as Adjacency RIB In (Adj-RIB-In 410), Adjacency RIB Out (Adj-RIB-Out 440) and local RIB (loc-RIB 420). Each neighbor/TCP connection 402 is associated with an Adj-RIB-In 410 and an Adj-RIB-Out 440. Note that this association is a conceptual data construct; there is typically not a separate Adj-RIB-In/-Out database for each neighbor.

The BGP protocol 400 runs inbound policy on all routes "learned" for each connection 402 and those routes that match are stored in an Adj-RIB-In 410 unique to that connection. Additional inbound policy 450 (filtering) is then applied to those stored is routes, with a potentially modified route being installed in the Loc-RIB 420. The Loc-RIB 420 is generally responsible for performing a BGP best path computation that selects the best route per prefix from the union of all policy-modified Adj-RIB-In routes, resulting in routes referred to as "best paths". The set of best paths is then installed in the routing table 235 of RIB 230, where they may contend with routes from other protocols (such as IGP 240) to become the "optimal" path ultimately selected for forwarding. Thereafter, the set of best paths have outbound policy 460 run on them, the result of which is placed in appropriate Adj-RIB-Out 440 and announced to the respective neighbors via the same TCP connections 402 from which routing update messages were learned.

In addition to providing a best path per prefix, the Loc-RIB 420 also provides the RIB 230 with a next hop attribute associated with that best path. That is, the route (best path per prefix) that BGP provides to the RIB includes an indication of the next hop address to that prefix. Notably, the next hop attribute (address) sent to the RIB 230 must be resident in the routing table 235 through another protocol (e.g., IGP 240). The BGP process 400 ensures that the next hop attribute is reachable within IGP prior to sending the best path to the RIB by performing certain validations or checks to the route, one of which is to verify that the next hop attribute is known by the RIB as a valid route. To that end, BGP 400 performs a look up operation into the RIB 230 (e.g., via the IPC mechanism) to verify that the next hop of the best path is already known (resident) in the routing table 235.

As noted, BGP-enabled routers 200a-c exchange routing information (i.e., external routes) with other BGP-enabled routers that are not in the same AS using eBGP. In response, each router 200a-c propagates (advertises) those externally "learned" BGP routes as BGP originated routes to its internal BGP neighbors within the AS using iBGP. That is, each BGP-enabled router advertises (injects) externally learned routes into its routing domain as iBGP routes using conventional BGP update messages. Yet since it is a router, the BGP-enabled router also executes the IGP protocol to thereby enable it to participate in both BGP and IGP routing. In this context, the BGP/IGP enabled router (hereinafter generally "BGP originator 200") performs (i) BGP routing to propagate external routes inside the AS and (ii) IGP routing to further propagate those routes as iBGP routes used as BGP next hop attributes. The BGP originator 200 advertises the external routes to its iBGP neighbors by identifying itself as the next hop address for those routes. In other words, the next hop address of the routes that the originator 200 advertises to its neighbors is, in fact, an IP loopback address of the originator.

The IGP (ISIS) process 240 enables the BGP originator 200 to advertise its loopback address within an LSA that is sent to its IGP neighbors.

The present invention is directed to a technique for configuring an intermediate network node, such as a router, to automatically determine whether a route advertised by a routing protocol is important for fast convergence in a computer network. As used herein, an important route needed for fast convergence is a route advertised by the routing protocol, such as BGP 400, as a next-hop address, since external connectivity relies on such a route. Notably, the BGP process 400 interacts with the IGP process 240 to identify the route as an important route. Identification of an important route, in turn, allows IGP to process the route in a high priority fashion, thereby facilitating fast convergence.

In the illustrative embodiment, the IGP process is the ISIS protocol process and the important route is a route that represents a BGP next-hop attribute. The inventive technique is thus illustratively directed to automatically (dynamically) determining such an important route using, e.g., ISIS route tagging. More precisely, the inventive technique allows the router to detect whether an IGP route is also used as a BGP next-hop attribute and, if so, advertise that route to IGP neighbors in the routing domain using ISIS route tagging so the neighbors (and router) can process the route with high priority during convergence. The router illustratively advertises the route via an IGP advertisement embodied as an LSA (e.g., an ISIS LSP).

An ISIS LSP may be used to distribute IP prefix reachability information throughout an ISIS routing domain (such as, e.g., an area, level or AS) using one or more type, length and value (TLV) tuples. For instance, an "extended IP reachability" TLV is (type 135) is typically included in an LSP to advertise, among other things, IP prefixes to IGP neighbors. The extended IP reachability TLV is described in more detail in RFC 3784, by H. Smit and T. Li, published June 2004, entitled *Intermediate System to Intermediate System (IS-IS) Extensions for Traffic Engineering (TE)* which is hereby incorporated by reference in its entirety.

Figure 5:
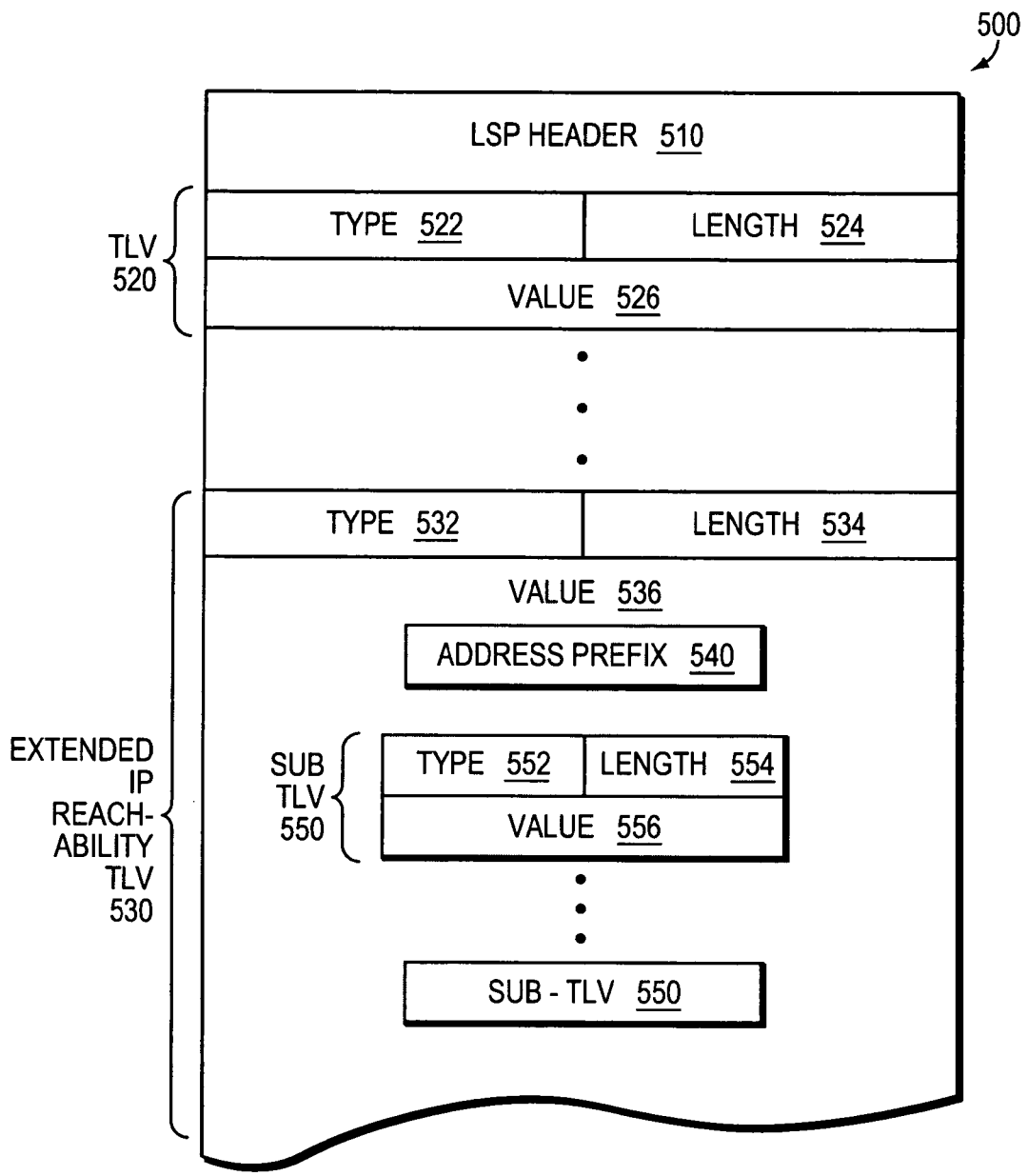
FIG. 5 is a schematic block diagram of an Intermediate-System-to-IntermediateSystem (ISIS) link state advertisement (LSA) that may be advantageously used in accordance with the present invention.

FIG. 5 is a schematic block diagram of an ISIS LSA (LSP) 500 that may be advantageously used in accordance with the present invention. The LSP 500 comprises a conventional LSP header 510 and one or more TLV tuples 520. The LSP header 510 stores, among other things, the LSP's ISIS version number, sequence number and relative "age", as well as authentication data and other packet-related information. Each TLV tuple 520 includes a type field 522, a length field 524 and a value field 526. The type field 522 indicates the type of information stored in the value field 526. The length field 524 identifies the length, usually in octets, of the TLV 520. The value field 526 stores the specific value transported by the TLV.

An example of a TLV tuple contained in the LSP 500 is an extended IP reachability TLV 530 that is extended to carry an address prefix reachable from a particular IGP router. To that end, the "extended reachability TLV" 530 is organized to include a type field 532 containing a predetermined type value (e.g., a "type 135" or "extended IP reachability" TLV), as defined in above-referenced RFC 3784. The length field 534 is a variable length value. The value field 536 illustratively contains, inter alia, the reachable address prefix 540, along with one or more sub-TLVs 550, each having a type field 552, length field 554 and value field 556. The fields of the sub-TLV(s) 550 may be used in a variety of manners including, for example, ISIS route tagging.

Figure 6:
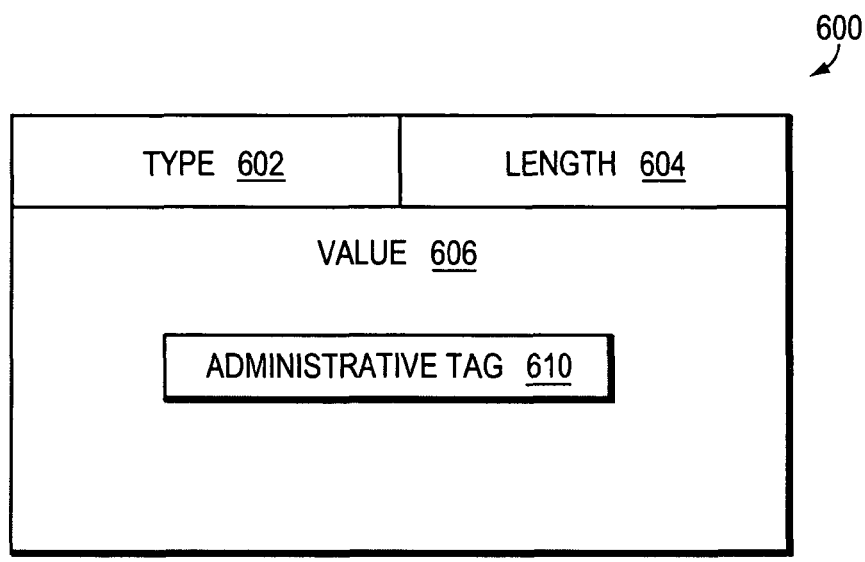
FIG. 6 is a schematic block diagram of an illustrative sub-type, length, value (TLV) tuple that may be advantageously used to store one or more administrative tags in accordance with the present invention.

FIG. 6 is a schematic block diagram of an illustrative sub-TLV tuple 600 that may be advantageously used to store one or more administrative tags in accordance with the present invention. The administrative tag sub-TLV is described in Internet Draft www.ietforg/internet-drafts/draft-ietf-isis-admin-tags-02.txt, July 2004, entitled *A Policy Control Mechanism in IS-IS Using Administrative Tags*, by C. Martin et al., which is hereby incorporated by reference as though fully set forth herein. The administrative tag sub-TLV 600 comprises a type field 602, a length field 604 and a value field 606. The type field 602 stores a value that identifies the sub-TLV 600 as an administrative tag subTLV. The length field 604 stores the length, in octets, of the sub-TLV 600. The value field 606 is configured to store one or more instances of administrative tag information 610. According to the invention, the administrative tag information 610 may be used to specify that the reachable address prefix ("local prefix") 540 stored in the extended IP reachability TLV 530 of LSP 500 is an important route for convergence.

Operationally, the BGP process 400 executing on router 200 to inject iBGP routes into the routing domain also interacts with IGP process 240 executing on the router to identify a local prefix used as a BGP next hop attribute for those iBGP routes injected into the domain. In particular, BGP 400 issues an IPC message (or function call) that informs IGP 240 that (i) BGP has advertised one or more iBGP routes using this local (address) prefix as the BGP next hop and (ii) if this address is advertised in IGP, tag those routes as important. Tagging, in this context, denotes route tagging and, as such, illustratively applies to the ISIS routing protocol implementation of the IGP.

Using ISIS route tagging, the router tags the local prefix as an important route for convergence and advertises that tagged route throughout the domain. For example, IGP 240 creates a LSP 500 with an extended IP reachability TLV 530 containing, inter alia, the reachable address prefix 540 and the administrative tag sub-TLV 600. The IGP process then inserts predetermined administrative tag information 610 into value field 606 that essentially tags the reachable address prefix (local prefix) 540 as important for convergence. In other words, the router 200 uses the administrative tag information 610 to tag the local prefix 540 advertised via IGP as important because that prefix/route is the next hop address of all the externally learned BGP routes. In response, all IGP routers (including the router 200) within the routing domain may detect the importance of the tagged route and apply high priority to the route during convergence processing.

In the illustrative embodiment, the IGP process 240 executing on the router 200 (and IGP neighbors) maintains a list of routes (prefixes) considered important for fast convergence. The list (not shown) is illustratively embodied as a data structure containing one or more entries, each of which is configured to store a prefix and a next hop address attribute denoting an important route. At each subsequent routing change requiring re-computation of its topology table and update of the RIB's routing table 235, IGP 240 processes these important routes before other routes.

Specifically, during fast convergence, the IGP process 240 operates on the content of its topology table 245 to compute a SPT and updates the RIB 230 in order to reflect the changes in the topology. Updating of the RIB 230 generally implies (i) removing prefixes, (ii) adding prefixes, and/or (iiii) modifying prefixes in the routing table 235. Thus, the prefixes that comprise the computed SPT are either (i) removed (deleted), (ii) added (installed) or (iii) modified (updated) in the routing table. Since it has been notified of the importance of certain routes/prefixes, IGP 240 processes (e.g., updates the RIB with) those important prefixes first to facilitate fast convergence.

Processing of important prefixes first facilitates fast convergence because the RIB process is a large (and time consuming) component of fast convergence. Computing an SPT takes only a few milliseconds, whereas computing or updating the routing table maintained by the RIB may take several hundreds of milliseconds. In this context, processing of important routes (prefixes) first facilitates convergence. Also, an IGP typically sends update information to the RIB sequentially and, as it receives and processes those updates, the RIB may constantly (sequentially) populate the FIB. In this manner, a forwarding engine operates on the FIB to render forwarding decisions using the results of those important processed routes.

Figure 7:
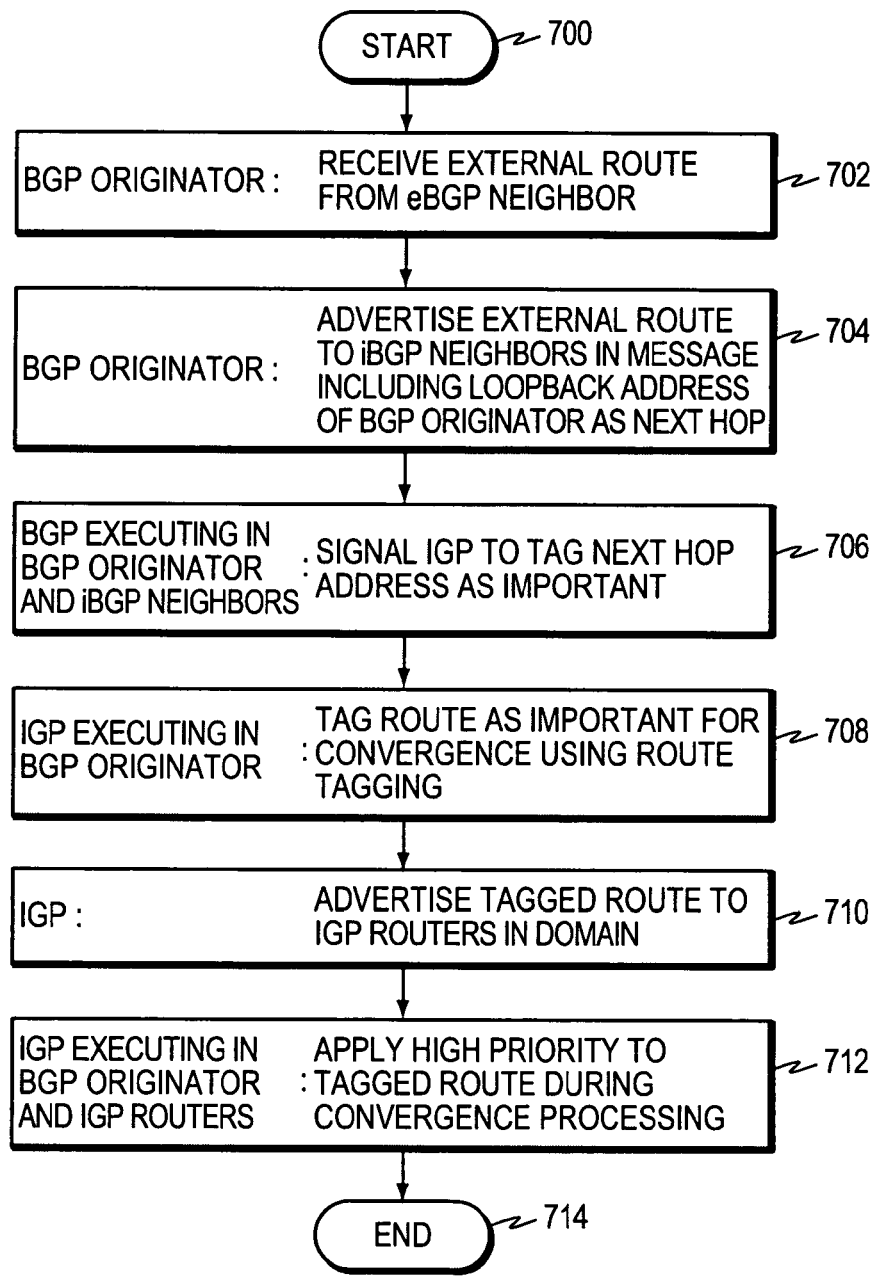
FIG. 7 is a flowchart illustrating a procedure for configuring the router to automatically determine whether a route advertised by a routing protocol, such as BGP, is important for fast convergence in the computer network.

FIG. 7 is a flowchart illustrating a procedure for configuring the router to automatically determine whether a route advertised by a routing protocol, such as BGP, is important for fast convergence in the computer network. The procedure starts at Step 700 and proceeds to Step 702 where a router (e.g., a BGP originator) receives from an eBGP neighbor one or more external BGP routes. In Step 704, the BGP originator advertises those BGP routes to its iBGP neighbors within the routing domain (AS) using one or more conventional BGP update messages that include a local address (i.e., loopback address) of the BGP originator as the next hop attribute. In Step 706, the BGP process 400 executing in the iBGP neighbors (and BGP originator) signals the IGP process 240 (e.g., via an IPC message or function call) to automatically tag this next hop address, which is also known to be advertised in the IGP, as important. Note that the loopback address had been previously advertised through IGP (ISIS), as determined by BGP 400 when performing a query (lookup operation) into its RIB 230 (described above).

In Step 708 the IGP process 240 executing in the BGP originator tags the local prefix/route as an important route for convergence (e.g., in accordance with ISIS route tagging). According to the invention, any address that is used as BGP next hop attribute is important for convergence. Therefore, rather than having an administrator configure each router to tag a particular local route with a predetermined value because it is an important route, the invention enables BGP to cooperate with IGP in order to tag the route dynamically. In Step 710, IGP advertises that tagged route to IGP neighbors (routers) throughout the domain. In response, all IGP routers (including the BGP originator) within the routing domain may detect the importance of the tagged route so that, in Step 712, the IGP process 240 may apply high priority to the tagged route during convergence processing. The procedure then ends at Step 714.

Advantageously, the present invention provides a technique whereby the importance of a route is determined by an originator of the route, e.g., the BGP process executing on a router, as opposed to a receiver of the route, e.g., the IGP process of the router and neighboring routers. Since the originator of the route sets the importance of the route, the inventive technique provides an efficient, "backward compatible" approach to determining whether a route advertised by a routing protocol, such as BGP, is important for fast convergence in a computer network.

While there has been shown and described an illustrative embodiment that configures an intermediate network node to automatically determine whether a route advertised by a routing protocol is important for fast convergence in a computer network, it is is to be understood that various other adaptations and modifications may be made within the spirit and scope of the present invention. For example, in an alternate embodiment of the invention, other IGP protocols, such as OSPF, may be configured to achieve the principles of the present invention. Although tagging of important routes is not currently fully deployable within OSPF, there is activity around extensions to the OSPF protocol that would enable tagging of routes. Yet until it is extended in order to fully support route tags on every route, implementations of the OSPF protocol may have to cope with certain topological constraints/limitations.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
exchanging, by a router in a routing domain, routing information with one or more other routers located external to the routing domain using an exterior gateway protocol (EGP);
exchanging, by the router, routing information with one or more other routers located internal to the routing domain using an interior gateway protocol (IGP);
detecting a route to be advertised by the IGP is also used as a next-hop attribute of a route advertised by the EGP;
in response to detecting that the route to be advertised by the IGP is also used as a next-hop attribute of a route advertised by the EGP, tagging the route advertised by the IGP as an important route for convergence to indicate that the tagged route is to be processed during convergence processing before other routes that have not been tagged; and
is advertising the tagged route within the routing domain using the IGP.

2. The method of claim 1, wherein the advertising further comprises:
sending a link state advertisement (LSA) that includes an administrative tag that indicates the tagged route is an important route for convergence.

3. The method of claim 1, further comprising:
receiving the tagged route at a neighboring router within the routing domain.

4. The method of claim 3, further comprising:
adding the tagged route to a data structure maintained at the neighboring router that lists routes that are considered important routes for convergence.

5. The method of claim 3, further comprising:
processing during convergence processing, at the neighboring router, the tagged route before other routes that have not been tagged.

6. The method of claim 5, wherein the processing comprises:
updating a routing information base (RIB) with the tagged route before updating the RIB with other routes that have not been tagged.

7. The method of claim 1, wherein the EGP is a Border Gateway Protocol (BGP) and the next-hop attribute is a BGP next-hop attribute.

8. The method of claim 1, wherein the EGP includes an external Border Gateway Protocol (eBGP) and an internal BPG (iBGP).

9. The method of claim 1, wherein the IGP is an Intermediate-System-to-Intermediate System (ISIS) protocol and the tagging is ISIS route tagging.

10. The method of claim 1, wherein the IGP is an Open Shortest Path First (OSPF) protocol.

11. An apparatus comprising:
one or more network interfaces configured to couple the apparatus to one or more routers located external to a routing domain and to one or more routers located internal to the routing domain;
a processor; and
a memory coupled to the processor, the memory configured to store software processes for execution on the processor, the software processes including
an exterior gateway protocol (EGP) process that is configured to exchange routing information with the one or more routers located external to the routing domain, and to advertise at least some routes learned from the one or more other routers located external to the routing domain into the routing domain, and
an interior gateway protocol (IGP) process that is configured to exchange routing information with the one or more routers located internal to the routing domain, and to tag a route advertised by the IGP process as an important route for convergence in response to a determination that the route is also advertised by the EGP process as a next-hop attribute, wherein the tag indicates the tagged route is to be processed during convergence processing before other routes that have not been tagged.

12. The apparatus of claim 11, wherein the IGP process is further configured to advertise the tagged route with a link state advertisement (LSA) that includes an administrative tag that indicates the tagged route is an important route for convergence.

13. The apparatus of claim 11, wherein the EGP process is a Border Gateway Protocol (BGP) process and the next-hop attribute is a BGP next-hop attribute.

14. The apparatus of claim 11, wherein the EGP process includes an external Border Gateway Protocol (eBGP) process and an internal BPG (iBGP) process.

15. The apparatus of claim 11, wherein the IGP process is an Intermediate-System-to-Intermediate System (ISIS) protocol process and the tagging is ISIS route tagging.

16. The apparatus of claim 11, wherein the IGP process is an Open Shortest Path First (OSPF) protocol process.

17. A non-transitory computer readable medium containing executable program instructions, the executable program instructions when executed operable to:
exchange routing information with one or more routers located external to a routing domain using an exterior gateway protocol (EGP);
exchange routing information with one or more routers located internal to the routing domain using an interior gateway protocol (IGP);
detect a route to be advertised by the IGP is also used as a next-hop attribute of a route advertised by the EGP;
tag, in response to detection that the route to be advertised by the IGP is also used as a next-hop attribute of a route advertised by the EGP, the route advertised by the IGP as an important route for convergence to indicate that the tagged route is to be processed during convergence processing before other routes that have not been tagged; and advertise the tagged route within the routing domain using the IGP.

18. The non-transitory computer readable medium of claim 17, wherein the executable program instructions operable to advertise further comprise executable program instructions operable to:
    send a link state advertisement (LSA) that includes an administrative tag that indicates the tagged route is an important route for convergence.

19. The non-transitory computer readable medium of claim 17, wherein the EGP is a Border Gateway Protocol (BGP) and the next-hop attribute is a BGP next-hop attribute.

20. The non-transitory computer readable medium of claim 17, wherein the EGP includes an external Border Gateway Protocol (eBGP) and an internal BPG (iBGP).

\* \* \* \* \*

UNITED STATES PATENT AND TRADEMARK OFFICE
CERTIFICATE OF CORRECTION

PATENT NO. : 8,467,394 B2
APPLICATION NO. : 13/149535
DATED : June 18, 2013
INVENTOR(S) : Clarence Filsfils et al.

It is certified that error appears in the above-identified patent and that said Letters Patent is hereby corrected as shown below:

In the Specification

Col. 1, line 41 should read: "~~Trans- mission~~ Transmission Control Protocol/Internet Protocol (TCP/IP)."

Col. 1, line 56 should read: "of government. To interconnect dispersed ~~is~~ networks and/or"

Col. 6, line 11 should read: "tagging, the router tags the local prefix as an important ~~is~~ route"

Col. 6, line 47 should read: "System-to-Intermediate_System (ISIS) link state advertise-"

Col. 7, line 17 should read: "Intermediate_System (ISIS) protocol. In addition, routing"

Col. 8, line 19 should read: "ment—and which relies on transport protocols for end-to-end"

Col. 8, line 41 should read: "computation is then ~~is~~ provided to the RIB 230. That is, the"

Col. 9, line 2 should read: "tecture of the BGP ~~proton col~~ protocol 400. BGP neighbors announce"

Col. 10, line 33 should read: "ity" TLV ~~is~~ (type 135) is typically included in an LSP to"

Col. 11, line 3 should read: "described in Internet Draft www.ietf.org/internet-drafts/draft-"

Col. 12, line 63 should read: "network, it is ~~is~~ to be understood that various other adapta-"

In the Claims

Col. 13, line 42 claim 1 should read: "~~is~~ advertising the tagged route within the routing domain"

Signed and Sealed this
First Day of October, 2013

Teresa Stanek Rea
*Deputy Director of the United States Patent and Trademark Office*